Patented July 11, 1933

1,917,250

UNITED STATES PATENT OFFICE

BENJAMIN R. HARRIS, OF CHICAGO, ILLINOIS

EMULSION

No Drawing. Application filed August 15, 1930, Serial No. 475,622. Renewed October 5, 1932.

My invention relates to water-oil emulsions and improvers therefor; it relates more specifically to an improved margarine, and improved substances for preventing spattering of the margarine during frying. The invention also deals with methods for producing the improving or anti-spattering substances.

The use of manufactured oil products and the like, for cooking and similar uses, is becoming more and more prevalent. The first of these "artificial" products to attain any popularity was margarine, and other products adapted for the same general use, and other cooking uses, are being developed from time to time. Many of these products, particularly margarine, are limited in their value by their behavior during frying, and while they are of great value in some respects, their over-all use is necessarily limited. Since margarine may be taken as illustrative of the entire group of these products, whether natural or artificial, I shall refer herein to the spattering behavior of margarine alone.

In comparing margarine with butter, which it most closely resembles, it is found to suffer as contrasted with butter in its behavior in frying. Under the usual frying conditions, it crackles much louder than butter, spurts and spatters more violently and behaves objectionably in that the milk curd, which is a part of the margarine, bakes onto the bottom of the frying pan, making subsequent cleaning difficult and laborious.

This baking onto the bottom of the pan also carries with it another serious disadvantage, namely, overheating, which results in a scorching of the milk curd itself and the article being fried. The margarine industry has failed to expand satisfactorily in recent years, in which there has been a great development in the use of artificial or manufactured shortening products, and probably the spattering tendency is the principal reason for this lack of development.

The manufacturers have made repeated attempts from time to time to overcome this difficulty by incorporating into the margarine egg yolk, egg yolk lecithin, or lechithins prepared from plant materials such as soy beans. For several reasons, these attempts have not met with success, principally, possibly, because the cost of these addition agents has been excessive for such a low priced article as margarine. Contamination of the margarine with bacteria in the egg yolk and with impurities present in the lecithin preparations is also to be feared, since the keeping qualities of the margarine even without this additional source of contamination are not of the best. There is also a justifiable apprehension with reference to the addition of lecithins because all the commercial lecithins furnished for the purpose are apt to liberate choline or other objectionable nitrogenous compounds such as trimethyl amine, which will cause a type of spoilage known as "fishiness", which at times affects butter. Lecithin extracts also are highly colored and may have an objectionable effect on certain types of margarine for this reason.

The principal object of my invention is to improve water-oil emulsions. Another object is the provision of means for providing new types of improving substances. Another object of my invention is to reduce or prevent spattering in oil and fat preparations such as margarine.

Another object is the provision of an anti-spattering agent which is free from choline or objectionable amines, or incapable of having liberated from itself these compounds in amounts which would be objectionable under conditions incident to margarine storage.

Another object is to prevent overheating during frying with preparations of the character described.

Another object is to reduce the baking of the curd onto the bottom of the frying pan.

Another object is to provide an anti-spattering agent in a substantially sterile condition.

Another and more specific object is to reduce spattering of margarine during frying.

I have discovered a large number of chemical substances, which, when suitably introduced into margarine, even in very minute proportions, markedly reduce, or almost entirely eliminate, the objectionable behavior of margarine in frying as above described. Some of these substances are effective when present in a proportion as small as one fortieth (1/40) of one percent (1%). Generally speaking, a proportion of the substance equal to two tenth (2/10) of one percent (1%) of the total weight of the margarine is sufficient to reduce the spattering to a point where it is no longer objectionable; in many cases, indeed, the spattering has been reduced by this means so as to be considerably better than in some butters—in fact, not perceptible at all. Greater proportions than the above, in the case of many of my anti-spattering or improving agents, may be used without detrimental effect.

In connection with the discovery of these anti-spattering agents, I have developed a working hypothesis which I shall present largely in the form of a theory, so that the full purpose and accomplishment of my invention will be apparent to those skilled in the art. While it may develop in the future that my theory is not scientifically accurate, still it enables me to obtain and duplicate results and I shall accordingly describe the invention somewhat in the nature of a scientific thesis.

Returning again to the consideration of these anti-spattering agents, the substances which I have discovered, broadly speaking, have certain characteristics in common, and it appears that these common physical and chemical qualities are in some manner intimately related to the anti-spattering rôle which they play in the margarine or other products in which they may be incorporated.

One of the outstanding characteristics of the substances, which I have found of value as anti-spatterers, is the presence of balanced lipophile and hydrophile groups. These groups seem to coact in the molecule in a certain balanced manner which will be brought out more clearly below by illustrations and discussion, and when incorporated in margarine, the substances seem to be concentrated at the water-oil interface and so influence spattering in a way which will be considered hereinafter.

I find that these substances should also be substantially non-volatile at the temperature at which the water boils off, and, in contradistinction to the lecithins heretofore known, should be incapable of having liberated from themselves choline or other objectionable nitrogenous substances under the conditions existing during the manufacture, storage and use of margarine. They are also compatible with mild acids in general, and in particular with lactic acid in concentrations and under the conditions prevailing in margarine. They are also sparingly soluble in water or in sodium chloride solutions and in fats and oils; in many cases, in fact, they are substantially insoluble in these media.

This, of course, appears largely to be due to the lipophile-hydrophile balance in the molecule and of relatively high molecular weight in the lipophile group, but it appears also that independent of this balance in the molecule, the anti-spattering agent should preferably be difficultly soluble so as to be capable of being effective in relatively small proportions, so that its introduction into the margarine or other oleaginous preparations does not adversely affect the general appearance or texture of the margarine. However, I have also discovered anti-spatterers which are substantially tasteless, colorless and odorless and which may be used in relatively greater proportions.

Referring now to the balance in the molecule between the lipophyllic and hydrophyllic groups therein, I have found that the lipophyllic group, in most substances which I have investigated, is, generally speaking, a radicle of predominantly hydrocarbon characteristics, though it may also be an alcohol or ether or ester group, or some other group as will appear from illustrations given below. The lipophyllic group has a marked affinity for oils and fats, is readily capable of being wet by oleaginous media and, in general, at the water-oil interface, tends to cause the molecule, of which it is a part, so to orientate itself, apparently, that the lipophyllic group may stand in relatively closer proximity to the oil medium or phase, as contrasted with the aqueous medium.

The lipophyllic group is preferably of moderately high molecular weight, as will be seen from illustrations given below; however, the preferred mangitude of the molecular weight of the lipophyllic group varies with the character of the hydrophyllic group or groups coacting with it. Generally speaking, sufficient lipophyllic mass and quality must be present in the molecule to properly offset and balance the hydrophyllic group. An exess of lipophyllic characteristics is undesirable, since, in such a case, the substance as a whole becomes predominantly lipophile, becomes rather freely fat soluble, no longer orientates itself at the interface of water and oil in the margarine emulsion and hence, largely loses it anti-spattering power. The above is merely a hypothesis which appears to fit the discovered facts and helps to explain them.

In the development of my invention, as previously stated, I have examined a very large number of substances, many of which had never been synthesized, as far as I know, before my investigation thereof. My investigation included the full consideration of several groups of chemical substances, and homologous series, as well as the investigation of isolated substances in various other groups where the investigation of a single compound seemed to be warranted, either for the purpose of locating a valuable anti-spatterer, or proving my hypothesis, in which the substance investigated would be expected to have no effect on spattering. In this connection, I have considered very thoroughly among others the following chemical groups: sulphuric acid esters, phosphoric acid esters, betaine esters, amides, derivatives of amino acids, derivatives of hydroxy acids, carboxylic acid esters, sulpho-fatty acid esters and sulphonic acids and their salts.

In general, I prepared the sulpho-fatty acid esters by reacting the halogen substituted (usually the brom or chlor substituted) fatty acid ester with a strong aqueous solution of normal sodium or potassium sulphite, $Na_2SO_3$ or $K_2SO_3$. The product I obtained is the alkali metal salt of a sulpho-fatty acid ester. For example, I prepared the sodium salt of cholesteryl sulphoacetate,

as follows: Nine parts of cholesterol, nine parts of brom acetyl bromide and forty parts of benzene were heated under a reflux condenser for two hours at the boiling point of the mixture. The reaction mixture was then washed repeatedly with hot water until it was substantially free of acid and freed of benzene by distilling from a steam bath. Seven parts of this reaction product were then treated with seven parts of sodium sulphite, ($Na_2SO_3$), dissolved in forty parts of hot water, for five hours at the temperature of a boiling water bath and with continuous, vigorous agitation. This reaction mixture was washed several times with hot brine until free of sulphites. The material may be dried and finally purified by extracting the impurities with dry ethyl ether. Analysis showed that the product was the sodium salt of cholesteryl sulphoacetate in relatively pure form, with an admixture of sodium chloride. However, even the crude material, with impurities present, is also suitable for the purpose of my invention.

While there seems to be no reason for considering all of these groups and the compounds composing them in any very great detail, it seems advisable to consider certain substances, most of which belong to one or more of these groups, for the purpose of explaining the features discussed with respect to the lipophile-hydrophile balance in the molecules.

A case in point is palmityl hydrogen sulphate in contrast to palmityl alcohol. The former is an effective anti-spattering agent, while the latter is worthless for the purpose.

It will be observed from the formula written below that each of these substances has both lipophile and hydrophile groups.

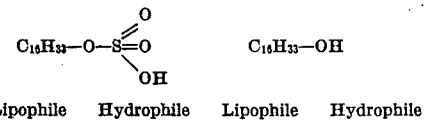

Lipophile   Hydrophile   Lipophile   Hydrophile

However, in the case of the palmityl alcohol, we have a predominantly lipophyllic substance soluble in fats and fat solvents. The hydrophile hydroxyl group is entirely overshadowed by the strong lipophyllic characteristics of the palmityl radicle. In the case of palmityl hydrogen sulphate, we have the same palmityl radicle for a lipophyllic group, but coacting with it we have the hydrogen sulphate radicle,

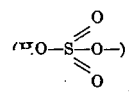

a radicle which is relatively much more pronouncedly hydrophyllic than the hydroxyl group in palmityl alcohol. The result is that in the case of palmityl hydrogen sulphate, we have a satisfactory balance of lipophyllic and hydrophyllic characteristics, with the result that palmityl hydrogen sulphate is an effective anti-spatterer, whereas palmityl alcohol is not.

I have found that the alkali and alkaline earth salts of palmityl hydrogen sulphate are as effective as the acid substance from which they are derived:

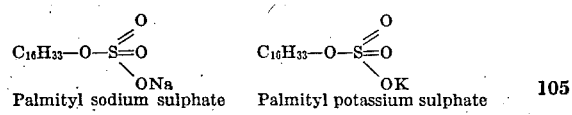

Palmityl sodium sulphate    Palmityl potassium sulphate

A similar case in point is melissyl alcohol, $C_{30}H_{61}OH$, and melissyl hydrogen sulphate. In this case, again, only the latter is an anti-spatterer. However, it is only about half as effective as the corresponding palmityl compound. It appears that in the case of melissyl hydrogen sulphate, the lipophyllic characteristics of the melissyl group are already somewhat too "strong", as compared with the hydrophyllic character of the hydrogen sulphate group. On the other hand, going down lower in the homologous series, below the palmityl group, say, down to ethyl sodium sulphate,

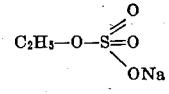

or to propyl sodium sulphate,

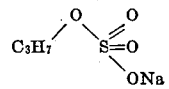

the lipophyllic character of the hydrocarbon portion of the molecule is diminished to such an extent that the hydrophile characteristics predominate, the substance is freely water soluble and devoid of anti-spattering power.

It appears that in a given homologous series, there is a point or range at or within which lipophile and hydrophile characteristics are so balanced that an optimum power for the prevention of spattering is imparted to the molecule. Going from this point, higher in the series, in the direction of increasing molecular weight in the lipophile group, the anti-spattering power diminishes because of excessive lipophile characteristics in the molecules; going down from this point or range, lower in the series, spattering power again diminishes because of excessive hydrophile characteristics in the molecules.

It follows from the above and from the fundamental characteristics of my anti-spatterers, as postulated above, that there are many types of substances, many types of homologous series, which at no point in the series will yield a substance with anti-spattering power. Take as an example of such a series, unsuitable for the purpose of my invention, the series of straight chain aliphatic alcohols. In the lower part of the series, the alcohols are too volatile and the hydrophyllic characteristics of the hydroxyl group dominate the molecule; this is reflected further in the fact that the substances are more or less freely soluble in water. Much higher in the series, the lipophyllic characteristics are excessive. Furthermore, between the two extremes, there is no intermediate range or point at which the lipophile and hydrophile functions balance each other satisfactorily, combined with sufficient non-volatility of the substance to give an anti-spattering agent under ordinary conditions.

What I have just said in reference to the straight chain aliphatic alcohols and what I say in reference to the sterrols hereinafter is not, however, to be considered as indicating that the hydroxyl group is incapable of functioning as the hydrophillic radicle in an anti-spatterer. It only means that since in general the hydrophyllic character of the hydroxy group is relatively weak, an accumulation of a number of hydroxyl groups is required to balance satisfactorily a lipophyllic radicle, for instance, such as stearyl,

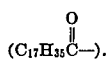

The "stearic acid ester of dextrose" and the "stearic acid esters of polyglycerols" which I have listed hereinafter in the Table of comparitive anti-spattering powers are examples of anti-spattering agents in which the hydrophyllic function of the molecule depends primarily on hydroxyl groups.

Glucosides and glucoside-like substances, such as some of the saponins, in which the lipophyllic and hydrophyllic functions are qualitatively balanced, represent anti-spatterers in which the hydrophyllic function is dependent largely, if not entirely, on hydroxyl groups. Digitonin is a case in point. As is well known, digitonin yields four molecules of sugar on hydrolysis, as indicated hereinbelow:

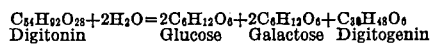

Digitonin is an effective anti-spatterer in which, apparently, the large accumulation of hydroxyl groups, furnished particularly by the sugar residues, supplies sufficient hydrophyllic character to balance the digitogenin.

The saponin sterides, again, are anti-spatterers, in which hydroxyl groups play the principal, if not the entire, hydrophyllic rôle. Digitonin cholesteride, prepared according to the method of Windaus (Hoppe-Seyler's Z. fur Phys. Chem. V. 65 (1910) pp. 110 to 117), is a good example of a saponin steride acting as an anti-spatterer. (See "Table of comparative anti-spattering powers", hereinbelow.)

I prepared the "stearic acid ester of dextrose" as follows: Four parts of dextrose (anhydrous) were dissolved in thirty parts of dry pyridine, by warming. This solution was cooled and seven parts of stearyl chloride were added to it in small portions, with simultaneous agitation and cooling. This mixture was allowed to stand at room temperature for twenty four hours and was then poured into iced, dilute sulphuric acid. The solid material was washed several times with water and air dried. This crude product showed a relative anti-spattering power of approximately 90% when introduced into margarine in the proportion of one half of one percent. When further purified, its anti-spattering value was still better.

By a similar method, I prepared an anti-spattering "stearic acid ester of sucrose."

I prepared the "stearic acid esters of polyglycerols" as follows: Fourteen hundred parts of anhydrous glycerol and thirty parts of fused sodium acetate were mixed and heated at 275° centigrade for five hours with a stream of carbon dioxide gas bubbling through the mixture continuously. Nine hundred thirty parts of this reaction mixture were then treated with hundred fifty five parts of stearic acid and heated with continuous agitation for sixteen hours at 190 to 200° centigrade. The product was a tacky solid at room temperature, of a dark color and emulsified readily with water. It was introduced in this form into margarine without further purification. This product is a mixture of various stearic acid esters of polyglycerols, which in part, can be represented by monostearyl-tetraglycerol:

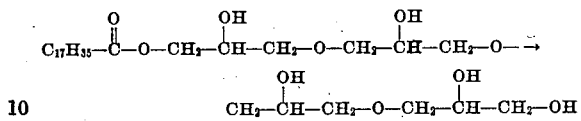

Another homologous series which I have studied in some detail is the series of aliphatic alcohol esters of betaine halides. The same general principle applies here.

| Substance | Constitutional formula | Relative anti-spattering power |
|---|---|---|
| Ethyl ester of betaine hydrochloride | $C_2H_5-O-\overset{O}{\overset{\|}{C}}-CH_2-\overset{Cl}{\underset{CH_3}{\overset{\|}{N}}}\diagdown\overset{CH_3}{CH_3}$ | Zero |
| Palmityl ester of betaine hydrochloride | $C_{16}H_{33}-O-\overset{O}{\overset{\|}{C}}-CH_2-\overset{Cl}{\underset{CH_3}{\overset{\|}{N}}}\diagdown\overset{CH_3}{CH_3}$ | Very good |
| Palmityl ester of betaine hydrobromide | $C_{16}H_{33}-O-\overset{O}{\overset{\|}{C}}-CH_2-\overset{Br}{\underset{CH_3}{\overset{\|}{N}}}\diagdown\overset{CH_3}{CH_3}$ | Excellent |
| Melissyl ester of betaine hydrobromide | $C_{30}H_{61}-O-\overset{O}{\overset{\|}{C}}-CH_2-\overset{Br}{\underset{CH_3}{\overset{\|}{N}}}\diagdown\overset{CH_3}{CH_3}$ | Fair |

In the above, it will be noted that the alkyl radicle is the lipophyllic group and a quaternary ammonium group is the hydrophyllic group.

Suitable derivatives of sterols are good anti-spatterers. Cholesterol and its derivatives may be taken as a satisfactory example. In cholesterol itself, $C_{27}H_{45}OH$, the hydroxyl group, (OH), is altogether inadequate sufficiently to balance the strong lipophile character of the heavy hydrocarbon residue, and cholesterol, therefore, is not an anti-spatterer. The cholesterol derivatives listed below, however, are powerful anti-spatterers, even when used in proportions much less than one tenth of one percent (0.1%).

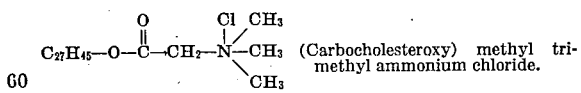 (Carbocholesteroxy) methyl trimethyl ammonium chloride.

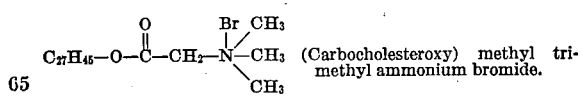 (Carbocholesteroxy) methyl trimethyl ammonium bromide.

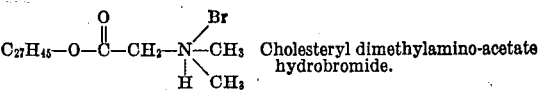 Cholesteryl dimethylamino-acetate hydrobromide.

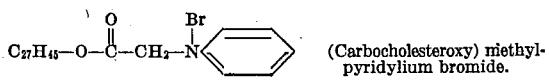 (Carbocholesteroxy) methyl-pyridylium bromide.

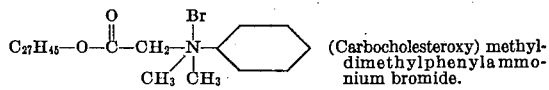 (Carbocholesteroxy) methyl-dimethylphenylammonium bromide.

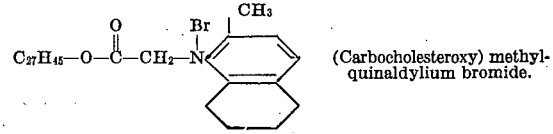 (Carbocholesteroxy) methyl-quinaldylium bromide.

I prepared the betaine derivatives in general by reacting a chloracetic or bromacetic acid ester of a desired alcohol with a tertiary amine in a suitable solvent for some time at room temperature or for a shorter time by heating under a reflux or in an autoclave to prevent escape of the amine in the case of volatile amines. The preparation of the cholesterol ester of betaine hydrochloride will serve as an illustration. Twenty parts of cholesteryl chloracetate dissolved in two hundred parts of toluene were treated with five sparts of trimethyl amine dissolved in fifteen parts of methyl alcohol in a tightly closed vessel. After standing at room temperature for two days, the product, a colorless, heavy powder, which had settled down to the bottom of the vessel, was filtered off, thoroughly washed with methyl alcohol and dried.

Most of the ordinary "sulphonated" oils of commerce such as many of the Turkey red oils are not suitable for the purpose of my invention; the acid products are soluble in fats,—in fact, miscible with oils; and the neutralized "sulphonated" oils are freely soluble in water. "Sulphonated" triricinolein, for example, and its sodium salt are not anti-spatterers. The characteristics of the hydrophile groups in the molecule are too dominant. However, by first esterifying the hydroxyl groups of the triricinolein and then "sulphonating" and neutralizing, I have succeeded in obtaining an anti-spattering agent.

What I have done here is to reduce the number of sulphate groups from six per molecule to three per molecule, and at the same time, I have nearly doubled the mass of the carbon hydrogen residue of the molecule, viz.: the lipophyllic group; that is to say, I have so altered the molecule which was devoid of anti-spattering power, as to attenuate its hydrophile characteristics and accentuate its lipophile characteristics to such an extent that a suitable balance exists between them and the molecule, as a whole, possesses anti-spattering power. A few constitutional formulæ will serve to represent these changes schematically:

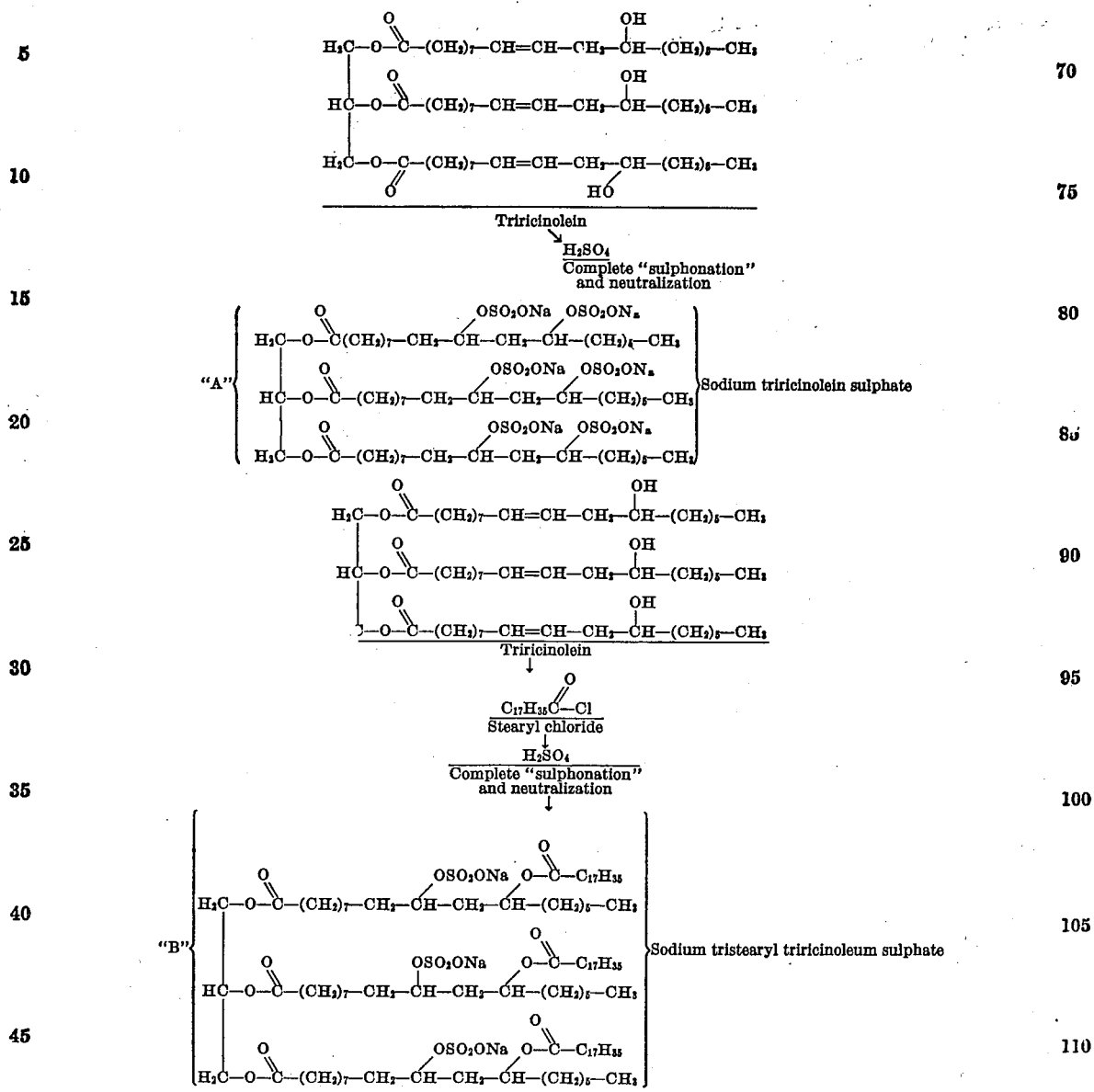

It will be observed that substance "A" has six sulphuric acid groups for a lipophyllic mass of eight hundred and eighty-four (884), whereas substance "B" has but three sulphuric acid groups for a lipophyllic mass of one thousand seven hundred and thirty-three (1,733). "B" is an anti-spatterer, and "A" is not. In round numbers, "B" has four times as much lipophyllic mass as "A" for each sulphuric acid group.

I have also discovered that it is possible to choose a fat or fatty substance (or any suitable substance whatever with a double bond capable of being "sulphonated"), with due regard to its composition prior to "sulphonation" and with due consideration to the balance between the hydrophile and lipophile groups which will exist subsequent to "sulphonation", so that an anti-spatterer will be obtained. As a matter of fact, I have prepared anti-spatterers by "sulphonating" the following natural and synthetic materials: Cocoa butter, beef tallow, beef stearine, partly hydrogenated cottonseed oil, distearo-mono-olein, and palmityl oleate. Their comparative anti-spattering powers are indicated in the table recorded later in the specification. Materials of similar character, e. g., lard, lard stearine, mutton tallow and the like, and suitable unsaturated petroleum hydrocarbons are similarly to be expected to yield anti-spattering agents.

It will help those skilled in the art better to understand my invention and the hypothesis which I have proposed to explain it, if I draw a typical contrast between a fatty substance which does yield an anti-spattering agent on being "sulphonated" and one which does not yield an anti-spattering agent when so treated. Cocoa butter and olive oil will serve this purpose.

It appears that olive oil, because it contains too large a proportion of oleic acid groups in its glycerides, on being "sulphonated" in the usual commercial manner, yields a material which is predominantly hydrophyllic; that is, the character and number of hydrophyllic groups present are too pronounced for the lipophyllic groups co-acting with them; whereas, cocoa butter, whose iodine number is relatively smaller than the iodine number of olive oil and whose glycerides consist to a great extent of distearo-mono-oleins, dipalmito-mono-oleins, mono-stearo-dioleins, etc., yields, on being "sulphonated", a material in which the hydrophyllic groups are more adequately balanced by the lipophyllic groups present so that anti-spattering action is imparted to the product of "sulphonation".

My procedure in "sulphonating" is pretty much the same as the known technical methods for preparing Turkey red oils and the like, excepting that in some instances, I prefer to use greater proportions of sulphuric acid than commonly employed. I have used other methods such as reacting the unsaturated material with chlor-sulphonic acid, or in the case of solid unsaturated materials, grinding the solid material with sulphuric acid at room temperature and then allowing it to react at room temperature, as well as other procedures. After the reaction is completed, the excess of sulphuric acid is washed out in the usual manner, preferably with brine, and if desired, the product may then be neutralized.

Thus I have discovered for example that by intimately mixing and allowing 120 parts of 95% sulphuric acid to react with 100 parts of beef tallow or beef stearine, and then washing out the excess acid with cold water or brine or with hot brine at a temperature sufficient to melt the product, I obtain materials which possess anti-spattering value if used in sufficient proportions as shown in the table inserted hereinafter. This product contains, in addition to the anti-spatterer, free fatty acids, unreacted tri-glycerides and other impurities.

One very satisfactory way of preparing my "sulphonated" monostearine is as follows: 20 parts, by weight, of stearic acid and 50 parts, by weight, of glycerine are heated together approximately at 200° C. with constant agitation for 8 hours. The fat layer is then separated from and washed free of excess glycerine and dried. This monostearine is then treated at room temperature with 2½ parts, by weight, of concentrated sulphuric acid, (sp. g. 1.84), and allowed to react about 15 hours. The product is then washed with brine until substantially free of excess sulphuric acid and neutralized to form the sodium salt of the "sulphonated" monostearine. This product while it contains some impurities such as intermediary unreacted monostearine and salt has satisfactory anti-spattering properties.

Throughout this specification, the term "sulphonation" is employed to designate a process resulting in the formation of an ester of sulphuric acid, whether it be by the addition of the elements of sulphuric acid to a double bond or by reaction of sulphuric acid, sulphuryl chloride, chlorsulphonic acid, sulphur trioxide or the like, with a hydroxyl group.

I have referred to the necessity of obtaining a proper qualitative balance between the lipophyllic and hydrophyllic group in the molecule, and I wish to point out that although molecular weight has some bearing on the lipophyllic or hydrophyllic tendency, as the case may be, of a particular group, it is not, by any means, controlling. Those skilled in the art will be aware of the fact that, in general, groups containing a total of less than twelve or fourteen carbons, are not likely to possess very strong lipophyllic characteristics; and, on the contrary, that groups containing more than, say, approximately thirty six carbons are likely to be too markedly lipophyllic unless they be balanced by a sufficient number of strong hydrophyllic groups. However, in addition to this quantitative factor in the lipophyllic characteristics, there is also a qualitative factor, as exemplified, for instance, by cholesterol, as contrasted with ceryl alcohol.

These two substances present lipophyllic groups with practically the same number of carbons, but nevertheless, some of the derivatives of cholesterol are from one and one-half to two and one-half times as active as the corresponding derivatives of ceryl alcohol. It appears that there is something in the complex structure of cholesterol, as contrasted with the simple straight chain configuration of ceryl alcohol, which imparts to its derivatives much more strongly pronounced anti-spattering qualities than are possessed by the corresponding derivatives of ceryl alcohol. It appears also that the lipophyllic strength of a given group is not necessarily a constant, but is a function in a sense, of the hydrophyllic group with which it is associated in the molecule and bears a reciprocal relation thereto.

After I have taught the above facts and principles, which I have discovered, and after I have disclosed the above means for applying these principles, many other variations and modifications in specific embodiments of my invention will be obvious to those skilled in the art of synthetic, organic chemistry. For hydrophyllic groups, in addition to those discussed above, phosphoric acids, phosphorous acids, sulphonic acids, amino acids, polybasic carboxylic acids, hydroxy carboxylic acids and polybasic hydroxy-carboxylic acids such as citric, malic, maleonic, tartaric and similar acids, and other groups and molecules with marked affinity for water, are available. For lipophyllic groups di and mono glycerides, semi-esterified glycols, carbohydrates partly esterified with fatty acids of sufficiently high molecular weight, and other molecules and groups with marked affinity for fat, suggest themselves. Several example are given below:

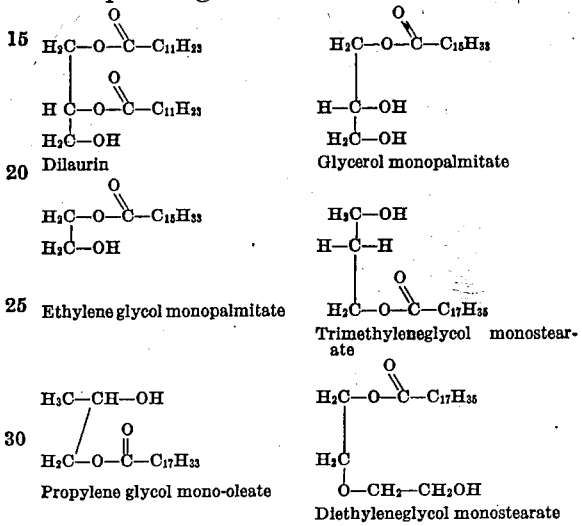

In cases where hydrogens, replaceably by metal, are available, as for example, in sulphuric, phosphoric, carboxylic acid groups, etc., innocuous cations, such as calcium, magnesium, sodium, potassium, ammonium and the like, may be substituted for the hydrogen; on the other hand, where desired, such hydrogens may be allowed to remain as such, for example, as in palmityl hydrogen sulphate.

I have found it useful to compare the anti-spattering powers of various substances by treating margarine with them in certain proportions and then submitting these margarines to a test under comparable conditions, where the amount of margarine lost by spattering may be largely taken as an index of the anti-spattering power.

The margarine lost in frying of a definite quantity may be caught by placing a sheet of paper under the vessel used for the frying test and weighing the paper before and after the frying, or a fairly accurate estimate may be made merely by inspection of a series of sheets of paper so obtained from frying tests on various margarines, taking into consideration the number of fat stains and their size, obtained from a measured amount of margarine.

I attach hereto a table of comparative anti-spattering values which I have determined, in which the cholesterol ester of betaine hydrochloride, when used in the proportion of one fifth of one percent, (.2%), is taken as the standard of comparison, inasmuch as practically all spattering is eliminated by the introduction of this proportion of the substance into the average margarine. As will be observed from an inspection of the table, untreated margarine occupies a zero position in the scale of comparative values.

In grading the various substances, however, I have also taken into consideration, besides reduction of spattering, the character of the foam during the frying, the degree and nature of the crackling, and the character of the browned curd, as well as the tenacity with which it clings to the bottom of the frying instrument.

Another difference, which varies in degree among the various anti-spattering agents, and which I have also taken into consideration in grading them, is that in untreated oleomargarine, during frying, the milk curd gathers in comparatively large, coarse masses or chunks, whereas in the case of margarine treated with an anti-spatterer, during frying, the curd appears in very small and finely divided particles. I have also considered the relative tendency to adhere to the bottom of the pan so as to cause over-heating and burning. This tendency is determined to a considerable extent by the character of the curd.

Commercial margarine, after being treated with my anti-spattering agents, when fried in a shallow pan, exhibits improved frying behavior in that it allows its water to boil off quietly, frys in a pleasing and comparatively quiet manner, with the formation of considerable turbid froth and foam after the manner of butter, reduces the tendency of the curd to stick to the bottom of the frying pan, and reduces the amount of material which escapes from the pan by spattering.

Untreated oleomargarine, on the other hand, when fried, bumps turbulently, sputters noisily and foams comparatively little. Also, what little foam there is, is transparent and of an entirely different character than that obtained from margarine previously treated with an anti-spatterer.

In practice, I do not intend always to purify my materials to obtain pure chemical compounds. I find it advisible and economical in many cases to leave a certain proportion of impurities, providing they are not objectionable for the purpose intended. Such materials will be useful in proportion to the active ingredients which they contain. In the examples which I cite in the "Table of comparative anti-spattering powers", in many instances I only partially purify my substances. In many cases, I allow a considerable proportion in the form of intermediary substances to remain, without purifying at all. It is evident that the degree of purification of the preparations used will have an influence on the degree of effectiveness.

It will be understood that in connection with the margarine I use only edible or innocuous substances whereas in other emulsions, intended for general technical purposes, any suit-

*Table of comparative anti-spattering powers*

| Substance | Proportions used | Comparative anti-spattering powers |
|---|---|---|
| | *Percent* | |
| Cholesteryl ester of betaine hydrochloride (Carbocholesteroxy) methyl trimethylammonium chloride | 0.2 | 100 |
| Cholesteryl ester of betaine hydrochloride | 0.05 | 90 |
| Cholesteryl ester of betaine hydrobromide | 0.2 | 100 |
| Cholesteryl ester of betaine hydrobromide | 0.05 | 90 |
| Palmityl ester of betaine hydrochloride | 0.1 | 95 |
| Palmityl ester of betaine hydrobromide | 0.1 | 95 |
| Palmityl hydrogen sulphate | 0.5 | 95 |
| Palmityl hydrogen sulphate $CH_3(CH_2)_{15}O-\underset{OH}{\overset{O}{\underset{\parallel}{S}}}=O$ | 0.1 | 85 |
| Melissyl hydrogen sulphate | 0.5 | 75 |
| $C_{15}H_{33}-O-\overset{O}{\overset{\parallel}{C}}-CH_2-\underset{}{\overset{Br}{\underset{\mid}{N}}}\langle\phantom{x}\rangle$ (Carbopalmitoxy) methyl pyridylium bromide | 0.5 | 85 |
| Potassium palmityl sulphate | 0.5 | 95 |
| Potassium palmityl sulphate | 0.1 | 85 |
| Calcium palmityl phosphate | 0.1 | 90 |
| Sodium palmityl phosphate | 0.5 | 80 |
| Palmityl phosphate | 0.5 | 50 |
| Melissyl ester of betaine hydrobromide | 0.5 | 70 |
| Melissyl ester of betaine hydrochloride | 0.5 | 80 |
| Sodium triricinolein sulphate | 0.5 | 0 |
| Sodium tristearyl triricinolein sulphate | 0.5 | 40 |
| Stearamide | 0.5 | 10 |
| $C_{27}H_{45}-O-\overset{O}{\overset{\parallel}{C}}-CH_2-\underset{}{\overset{Br}{\underset{\mid}{N}}}\langle\phantom{x}\rangle$ (Carbocholesteroxy) methyl pyridylium bromide | 0.2 | 100 |
| $C_{27}H_{45}-O-\overset{O}{\overset{\parallel}{C}}-CH_2-\underset{H_3C\phantom{x}CH_3}{\overset{Br}{\underset{\mid}{N}}}\langle\phantom{x}\rangle$ (Carbocholesteroxy) methyl dimethylphenyl-ammonium bromide | 0.2 | 100 |
| $C_{27}H_{45}-O-\overset{O}{\overset{\parallel}{C}}-CH_2-\underset{}{\overset{Br}{\underset{\mid}{N}}}\langle\phantom{x}\rangle\langle\phantom{x}\rangle$ (Carbocholesteroxy) methyl quinaldylium bromide | 0.2 | 100 |
| Triethanol amine oleate | 0.5 | 0 |
| Isopropyl napthalene sodium sulphonate | 0.5 | 0 |
| Untreated margarine | | 0 |
| Cholesteryl dimethyl-aminoacetate hydrobromide $C_{27}H_{45}-O-\overset{O}{\overset{\parallel}{C}}-CH_2-\underset{H}{\overset{CH_3\phantom{xx}CH_3}{\underset{\mid}{N}}}-Br$ | 0.5 | 85 |
| Melissyl alcohol | 0.5 | 0 |
| Melissyl phosphate | 0.5 | 75 |
| Melissyl calcium phosphate | 0.5 | 60 |
| Palmityl alcohol $CH_3(CH_2)_{15}OH$ | 0.5 | 0 |
| Cholesterol | 0.5 | 0 |
| Triricinolein (Appears to increase spattering.) | 0.5 | 0 |
| Palmityl ester of dimethylaminoacetic acid hydrobromide $C_{15}H_{33}-O-\overset{O}{\overset{\parallel}{C}}-CH_2-\underset{Br\phantom{x}CH_3}{\overset{CH_3}{\underset{\mid}{N}}}-H$ | 0.5 | 80 |
| Ethyl sodium sulphate $C_2H_5O-\underset{ONa}{\overset{O}{\underset{\diagdown}{S}}}=O$ | 0.5 | 0 |
| Propyl sodium sulphate $C_3H_7O-\underset{ONa}{\overset{O}{\underset{\diagdown}{S}}}=O$ | 0.5 | 0 |
| Calcium triricinolein phosphite | 0.5 | 40 |
| Calcium palmityl sulphate | 0.1 | 90 |
| Magnesium palmityl sulphate | 0.1 | 90 |
| "Sulphonated" cacaobutter | 0.5 | 75 |
| "Sulphonated" beef tallow | 0.2 | 80 |
| "Sulphonated" beef tallow | 2.0 | 95 |
| "Sulphonated" beef stearine | 1.0 | 90 |
| "Sulphonated"—α, β distearo-mono-olein, sodium salt | 0.5 | 70 |
| "Sulphonated" palmityl oleate, sodium salt | 0.5 | 35 |
| "Sulphonated" monostearine, sodium salt | 0.5 | 95 |
| Hydroxystearic acid, $CH_3-(CH_2)_7-CH(OH)-(CH_2)_8-COOH$ | 2.0 | 0 |
| Hydroxystearic acid | 0.5 | 0 |
| Stearyl glycolic acid, sodium salt $C_{17}H_{35}\overset{O}{\overset{\parallel}{C}}-O-CH_2\phantom{xx}$ $NaO-\underset{O}{\overset{\phantom{x}}{\underset{\parallel}{C}}}$ | 1.5 | 50 |

Table of comparative anti-spattering powers—Continued

| Substance | Proportions used | Comparative anti-spattering powers |
|---|---|---|
| Monostearine sulphoacetate sodium salt, (crude form) | *Percent* 0.5 | 95 |
| Monostearine sulphoacetate sodium salt, (purified) | 0.08 | 90 |
| Palmityl sulphoacetate, (sodium salt)  $CH_3-(CH_2)_{14}-CH_2-O-C(=O)-CH_2-S(=O)(=O)-O-Na$ | 0.2 | 90 |
| Cholesteryl sulphoacetate (potassium salt)  $C_{27}H_{45}-O-C(=O)-CH_2-S(=O)(=O)-OK$ | 0.4 | 90 |
| Palmityl sulphonic acid (sodium salt)  $CH_3-(CH_2)_{14}-CH_2-S(=O)(=O)-O-Na$ | 0.1 | 85 |
| Ceryl sulphonic acid (sodium salt)  $CH_3-(CH_2)_{24}-CH_2-S(=O)(=O)-O-Na$ | 0.1 | 85 |
| "Stearic acid ester of dextrose" | 0.5 | 90 |
| "Stearic acid esters of polyglycerols" | 1.5 | 30 |
| Digitonin (Merck's) (spattering almost completely eliminated; sticking, only partly) | 0.5 | 90 |
| Digitonincholesteride | 0.5 | 80 |
| Oleyl diethyleneglycol sulphoacetate  $C_{17}H_{33}-C(=O)-O-CH_2-CH_2-O-CH_2-CH_2-O-C(=O)-CH_2-S(=O)(=O)-O-Na$ | 0.5 | 80 |
| Stearyl diethyleneglycol sulphoacetate, sodium salt | 0.1 | 95 |
| "Stearic acid ester of sucrose" | 0.5 | 95 |
| $CH_3-(CH_2)_{14}-CH_2-O-P(=O)(OH)(OH)$ | 0.6 | 95 |
| $[CH_3-(CH_2)_{14}-CH_2-O]_2 P(=O)(ONa)$ | 1.0 | 75 |
| $[CH_3-(CH_2)_{14}-CH_2-O]_2 P(=O)(OH)$ | 0.9 | 75 |
| $C_{27}H_{45}-O-P(=O)(OH)(OH)$  (Monocholesteryl dihydrogen orthophosphate) | 1.0 | 75 |
| $[C_{27}H_{45}-O]_2 P(=O)(OH)$  (Dicholesteryl hydrogen orthophosphate) | 0.7 | 80 |
| $CH_3-(CH_2)_{24}-CH_2-O-P(=O)(OH)(OH)$  (Ceryl dihydrogen orthophosphate) | 0.5 | 75 |
| $C_{17}H_{35}-C(=O)-O-CH_2-CH_2-O-CH_2-CH_2-O-P(=O)(OH)(OH)$  (Stearyl diethyleneglycol dihydrogen orthophosphate.) | 1.0 | 95 |
| $[C_{17}H_{35}-C(=O)-O-CH_2-CH_2-O-CH_2-CH_2-O]_2 P(=O)(OK)$ | 1.0 | 90 |
| $C_{15}H_{31}-C(=O)-NH-CH_2-C(=O)-OH$  (Palmito-glycine) | 1.0 | 60 |
| Stearyl creatinine (sodium salt) | 1.0 | 40 |
| $C_{17}H_{35}-C(=O)-NH-CH(C(=O)OH)-CH_2-CH_2-C(=O)-OH$  (Stearyl glutamic acid) | 0.5 | 90 |
| $C_{15}H_{31}-C(=O)-NH-CH(C(=O)OH)-CH_2-CH(CH_3)-CH_3$  (Palmito-leucine) | 1.0 | 70 |
| Monostearyl sucrose | 0.5 | 90 |
| Stearyl tartaric acid | 0.5 | 75 |
| Mannitol Monopalmitate | 1.0 | 95 |
| Stearyl citric acid (sodium salt) | 0.9 | 30 |
| Mucic acid monopalmitate | 1.0 | 85 |
| Stearyl malic acid  $C_{17}H_{35}-C(=O)-O-CH(C(=O)OH)-CH_2-C(=O)-OH$ | 1.0 | 90 | able improver may be used without reference to its fitness for food purposes.

The examples given in the above table, it will be observed, confirm the views expressed in the specification preceding the table.

The effect of quality and quantity in the lipophyllic group becomes evident when the quantitative results are compared; considerations pertaining to the balance of lipophyllic and hydrophyllic groups are brought out by comparing anti-spattering powers of related compounds; examples of several types of homologous series of anti-spattering agents are given.

Finally, there are several examples of substances with lipophyllic and hydrophyllic groups, which, however, lack anti-spattering power. In the case of triethanol amine oleate, isopropyl naphthalene sodium sulphonate and sodium triricinolein sulphate, the hydrophyllic character is too pronounced; the substances are rather freely soluble in water and perceptible anti-spattering power is absent.

In the case of cholesterol, palmityl alcohol and melissyl alcohol, as stated above, and also in hydroxystearic acid, the lipophyllic character is predominant and inadequately balanced by the hydroxyl group to endow the molecule with anti-spattering power.

The table of substances given above, (which represents only a small part of the substances with which I have experimented), is for purposes of illustration, and the substances, as considered therein, are graded only according to their anti-spattering power and other frying characteristics. It is obvious that substances having very great anti-spattering power might be improper for general use for other reasons, principally, possibly, on account of prohibitive cost. The table shows that I have examined many substances which would have satisfactory anti-spattering powers for commercial use. I have found, however, for practical purposes, considering economy, etc., that the best of the substances outlined above, for use with margarine, is calcium palmityl sulphate. This substance is economically manufactured, has sufficient anti-spattering power for practical use, and is possessed of all the other attributes, making it a valuable commercial substance. Palmityl alcohol is a saturated, straight chain, sixteen carbon alcohol, the alcohol corresponding to palmitic acid, which is a common constituent of most vegetable and animal oils and fats. Throughout this specification, "palmityl" is employed to designate the straight chain, aliphatic alkyl radicle $C_{16}H_{33}$.

In connection with the use of the anti-spattering agents discussed above, I have found that practically all of these substances are valuable as emulsifying agents when used with oil water emulsions, so that besides acting as anti-spatterers, they have other valuable properties, and they may be employed in such a way as to utilize primarily their value as emulsifying agents. Since most of them are practically tasteless, odorless and colorless, they may be used in proportions great enough to act as true colloidal or emulsifying agents without deleteriously affecting the taste, etc., of the substance in which they are used where such substance is intended to be eaten. By means of my invention, I am enabled to produce emulsions of real inherent stability, which have not been susceptible of commercial production heretofore; and, in addition, such substances can be employed for frying and similar purposes because the emulsifying agent used plays a concomitant anti-spattering role.

In the preliminary paragraphs in the present specification, I refer to substances having the same general character as margarine and which can be improved by the introduction of my anti-spattering agents. Among these products are many fats and oils used for culinary purposes such as renovated butter, which is worthless for frying as used at present, but which can be made to behave in all essential respects, when frying, like ordinary first grade butter. There are also water oil emulsions which are used very extensively in the baking industries for shortening purposes. These emulsions are limited in their value and I can incorporate an anti-spattering agent with these substances and greatly improve the same. It is to substances such as these, among others, that I contemplate adding my anti-spattering compounds in sufficient amounts to increase the inherent stability of the emulsion. I also anticipate the employment of my anti-spattering agents for emulsifying purposes, in order to add water or other aqueous liquids to such natural products as lard or the like used to form relatively low water content emulsions in order to increase the commercial value of these substances for certain uses. It is well known that in incorporating fats or oils with flour batter or the like, a fat, which is originally in a somewhat dispersed condition, can be more readily distributed to give a homogeneous mixture than a fat or oil in its natural unemulsified condition. These are examples merely of the use and value of my invention and are given for the purpose of acquainting those skilled in the art with the full details thereof.

My anti-spattering agents are generally speaking semi-colloidal in character and many of them possess truly colloidal characteristics. The concomitant feature of this colloidal character is that many of my anti-spattering agents are capable of functioning as softening, wetting, detergent, lubricating, frothing and penetrating agents and emulsifying agents in the arts where such agents are employed.

It will be recalled that the statement was made that the anti-spatterers of my invention should be compatible with acids in general and lactic acid of the concentrations found in margarine in particular. For this reason, most of the common soaps such as sodium stearate, sodium palmitate, potassium oleate, etc., cannot be used with any degree of satisfaction.

I have described a new class of materials with valuable new uses, and have explained in full detail the determining characteristics of members of the class so that experienced chemists may readily duplicate my results. With my principles established and the new discovered facts disclosed, the skilled chemist may select many substances in addition to those which I have described, which will function in a satisfactory manner, and wherein proper balance of the two kinds of groups exists. Similarly, the skilled chemist will be able to rule out many materials which will have no value for my purpose. The compounds having two types of groups, one hydrophile and the other lipophile, but wherein the balance is in doubt (the other class determinants being present) may be tested for balance by a simple test readily and easily made in a very few minutes' time.

The "balance," of the hydrophile-lipophile groups in the compounds which I employ in my invention, is one of the characteristic determinants of the class of substances which I employ.

The test which I have chosen as a means for determining the hydrophile-lipophile balance in organic compounds, I call the "spoon test". It is carried out as follows: From 0.05 to 0.10 grams of the material or substance in question is introduced into a porcelain mortar, wetted and ground into a smooth paste with a pestle with a minimal proportion of water; two to five drops generally suffice.

An ordinary margarine such for example as one made from vegetable oils, and fats and cultured skimmed milk and which possesses the usual property of spattering during frying is selected. 10 grams of this margarine are then introduced in small portions into the mortar and macerated thoroughly with the paste first prepared until the entire 10 gram portion is thoroughly and uniformly intermixed with the material in the mortar. 2 grams of this mixture are introduced into a table spoon and held directly over a free flame such as for example a Bunsen flame, one or two inches long, in such a position that the point of the flame just about reaches the bottom of the spoon. A clean sheet of paper is placed on the bottom of the burner by inserting the stem of the Bunsen burner prior to lighting through a hole made in the center of the paper and allowing the paper to drop to the base of the burner to catch the margarine splashed out during heating. The mixture in the spoon is heated until all of the water boils off and the ebullition ceases and the spots on the paper observed.

If this treated margarine spots the paper to the same extent as the untreated margarine from which the former was prepared, then the lipophile and hydrophile groups of the compound are not balanced. The number and size of spots on the paper or the added weight can be readily determined.

If the increase in weight of the paper or the number and character of the spots produced on the paper up until all the water has boiled off are less than that produced by similarly heating two grams of the original untreated margarine employed for the test, then the material or substance in question has balanced hydrophile-lipophile groups. The expression "balanced lipophile and hydrophile groups" used in the claims is to be interpreted in terms of the above described "spoon test" when construed in the light of the entire disclosure.

In making the test usually not more than 2% by weight of the compound need be introduced into the test margarine, because as a rule, if this amount does not materially affect the spattering, the compound is not of great value. I have made certain observations, however, which may be helpful to the chemist in making his calculations. If the compound is in a pure state, I have found that as far as anti-spattering power is concerned, the proportion used is of minor importance, at least between certain ranges. I found, for example, that in very active compounds, .05% of the compound is almost as effective as 2%. If the compound is obtained in an impure state, admixed with substances having no anti-spattering power, then a relatively larger amount may have to be used. In making the test for balance, therefore, the amount of substance added to the margarine should be preferably calculated on the basis of the actual amount of supposed anti-spattering substance present. When the investigator is in doubt of the purity of the compound, it is also advisable to use a slightly higher percentage.

There may be other methods devised to determine the hydrophile-lipophile balance of organic compounds, but because of its simplicity I have chosen the above described "spoon test" for use in doubtful cases. I consider this test not only as an index as to whether a given compound is suitable to be introduced into commercial margarine to reduce spattering during frying, but also as a criterion of the emulsifying value of the compound and of its effectiveness for other purposes when used in connection with other edible and nonedible materials.

Those of my anti-spatterers which are structurally derived from oxygenated sulphur acids and oxygenated phosphorus acids, e. g., those of them which are sulphates, sulphites, phosphates, phosphites, hypophosphites, sulphonic acids, phosphonic acids, etc., may be represented by the symbol

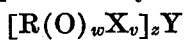

in which "R" represents an alkyl group, a substituted alkyl group or some other lipophile group; "O" stands for oxygen, $w$, $v$ and $z$ are whole numbers "Y" represents innocuous cations such as hydrogen, calcium, magnesium, aluminum, sodium, potassium, ammonium, substituted ammonium, etc.; and "X" stands for sulphur or phosphorus combined in the form of their oxygen acid radicles.

Somewhat more specifically, they may be represented by the formula

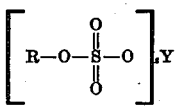

in which "R" is a lipophyllic residue, "Y" is an innocuous cation, "O" represents oxygen, and "S" sulphur, and $z$ is a whole number.

The examples I have given hereinabove are to be taken strictly as illustrative embodiments of some of the ways in which my invention may be carried out in practice. Inasmuch as many changes in the composition of the anti-spatterers and many variants in combinations of balanced hydrophile and lipophile groups could be made without departing from the scope of my invention, since these would merely be different embodiments of the same invention, it is intended that all of the above shall be construed as illustrative of the new art which I teach but shall not be interpreted in a limiting sense.

Not only do I disclose a new class of substances, setting forth many members of the class, but in addition, I teach those skilled in the art the manner or method to be followed in producing additional members of the class not heretofore known, but all of which may have a valuable use. Briefly, this method consists in selecting a substance with a dominant group, either lipophile or hydrophile in character, and then further treating the compound to balance the dominant group with a group of opposite character so that the final compound will possess both groups in balanced relation. This may be done in many specific ways, many of which are described herein, and others of which skilled chemists may determine, depending upon the nature of the compound or substance treated.

My anti-spatterers may be introduced into margarine or other fatty materials in a number of suitable ways. On an industrial scale, the anti-spatterer may be made into a paste with cold fresh, or cold cultured, fermented milk or water or it may be made into a paste with hot, fresh milk and then allowed to cool. This paste may then be further diluted with a larger quantity of milk and this preparation then emulsified in the usual manner with oleaginous substances such as edible oils and fats by churning.

The anti-spatterer may also be dispersed in the melted oils and fats and then churned with the milk in the usual manner.

In practice, 0.5 pound of the material containing monostearine sodium sulphate is dispersed and macerated with 1½ to 2 lbs. of milk into a paste and introduced into 100 lbs. of margarine by means of blending. If desired about 8 ounces of calcium palmityl sulphate may be macerated with 2 lbs. of milk and blended into the 100 pound margarine batch in the usual blender.

Still another method is to prepare a dry mixture of the anti-spatterer in a finely powdered form with the salt and to use this mixture for salting the margarine. The anti-spatterer in this case becomes distributed in the margarine together with the salt, while the salt is being worked and/or blended into the margarine. Furthermore, any other method which insures an adequate distribution of the anti-spatterer in the margarine is satisfactory for the purpose.

Another method is first to make the emulsion in the usual manner, and then before crystallizing to admix the anti-spatterer therewith so as to bring about the proper dispersion, accompanying the dispersion with a minimum amount of agitation. This prevents bleaching action, which may result from the use of the anti-spatterer by reason of the greater dispersion of the ingredients of the emulsion resulting from such use. However, the product after crystallizing and tempering may be blended with or without additional milk in the usual manner.

The amount of anti-spattering compound used will vary considerably, depending upon the specific character, purity, etc., of the substance, but in general, the amounts will be very small. As the comparative table shows, the amounts which I have used in practice range from about .05% to 2%, but these percentages are by no means the only ones which can be used with satisfaction. Relatively inactive compounds or those in which the balance existing between the groups is poor, may be used in much greater amounts where the conditions would warrant such use.

As I have previously explained, the anti-spattering compounds of my invention are effective when used in margarine in very small quantities. Since they are used in such small quantities they must be introduced into the margarine in such a way as to obtain a uniform dispersion. I have found that they can be handled better and are more effective when they are admixed with other substances which have no anti-spattering effect upon the margarine and simply serve as carriers or dispersing media for the anti-spattering compound. The substances with which the anti-spatterer can be mixed are any oleaginous or aqueous materials suitable for introduction into margarine. I have found in general, that the best mixture yields a material in which the anti-spatterer is present in proportions not greater than approximately 50% of the whole nor materially less than about 10%, although the proportions may be greatly modified and the invention practiced with satisfaction.

This feature of using the anti-spatterer admixed with other substances is of unusual value when the processes for producing the anti-spatterers are considered. I have found that in most instances it is exceedingly expensive to carry a process out in such a way that a yield of a substance which is a pure anti-spatterer is obtained. For example, where sulphonation is required, it may be extremely difficult to carry the process out so that the entire substance treated is affected by the sulphate radical.

Thus, for example, a considerable amount of triglyceride may be left as a carrier for the active anti-spatterer. In cases where monostearine is used for example, to produce a sulphate or phosphate compound as an anti-spatterer, a considerable amount of unreacted lipophile substance such as monostearine may be left, which is a carrier for the active anti-spattering substance.

The same is true when higher aliphatic alcohols are used as the lipophyllic group. Accordingly, it is the purpose of my invention to include the materials produced in this manner and including anti-spattering compounds.

In many instances, while the intermediary substances have no anti-spattering value, they may have other properties which are valuable in margarine or in other emulsions.

In order to avoid any possibility of spoilage, or injury to the margarine by reason of the liberation of choline, amines or other objectionable nitrogenous compounds of any character, the investigator, or those practicing my invention may find it advisable to use non-nitrogenous compounds under all circumstances. While I have illustrated a number of nitrogenous compounds, these have been shown as representative of certain types of substances which may be used in accordance with my invention. In general, however, I wish to state that most of the nitrogenous substances given may have a valuable use.

Finally, I wish to point out (and this appears clear to any skilled chemist) that each combination of lipophile and hydrophile groups has its own peculiarities, and it is obviously impracticable and unnecessary to list each particular combination of balanced lipophile and hydrophile groups. My invention deals with large classes of substances defined by the attached claims, and while I leave something to the skill of persons applying the invention, my disclosure is clearly sufficiently exhaustive to guide those skilled in the art, to successful practical use thereof.

The present application is a continuation in part of my prior copending application, Serial Number 383,143, filed August 2, 1929.

The term "non-spattering margarine" as employed in the claims is used to designate a margarine, the frying behavior of which is improved by the addition thereto of the compounds of my invention herein described.

The term margarine as used in the claims includes edible emulsions of oleaginous and aqueous substances; it being understood that any of the customary combinations or blends of edible fats and oils can be used, and any suitable aqueous material such as sour milk, sweet milk, brine or the like. This includes colored or uncolored goods, such for example as ordinary margarine of commerce produced for table use, puff paste, renovated butter and any fatty-aqueous composition which may be used in frying.

What I claim is new and desire to protect by Letters Patent of the United States is:—

1. A non-spattering margarine containing an oleaginous phase and an aqueous phase and having included therein a non-nitrogenous improving agent sparingly soluble in aqueous and/or oleaginous media, non-volatile at water boiling temperatures, compatible with acids, characterized by balanced lipophile and hydrophile groups and represented by the formula

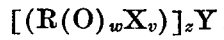

in which "R" stands for a lipophile residue having more than 18 carbon atoms, "O" stands for oxygen, "$w$", "$v$" and "$z$" are whole numbers, "Y" represents innocuous cations, and "X" stands for sulphur in the form of its oxygen acid radicals.

2. A non-spattering margarine containing an oleaginous phase and an aqueous phase and having included therein a non-nitrogenous ester characterized by balanced lipophile and hydrophile groups, and represented by the formula

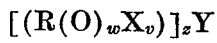

in which "R" stands for a lipophile residue having more than 18 carbon atoms, "O" stands for oxygen, "$w$", "$v$" and "$z$" are whole numbers, "Y" represents innocuous cations, and "X" stands for sulphur in the form of its oxygen acid radicals.

3. A non-spattering margarine containing an oleaginous phase and an aqueous phase and having included therein a proportion of an improving agent comprising a non-nitrogenous substance characterized by a hydrophile group balanced by a lipophile group in the form of a higher aliphatic radical having more than 18 carbon atoms.

4. A non-spattering margarine containing an oleaginous phase and an aqueous phase and having included therein a non-nitrogenous substance represented by the formula

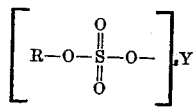

in which "R" is a lipophile residue having more than 18 carbon atoms balanced by the sulphate radical, "S" is sulphur, "O" represents oxygen, "Y" represents innocuous cations, and "z" is a whole number.

In witness whereof I hereunto subscribe my name this 11th day of July, 1930.

BENJAMIN R. HARRIS.